Nov. 10, 1953 R. A. DE WITT 2,658,605
CONVEYER
Filed June 15, 1949 2 Sheets-Sheet 1
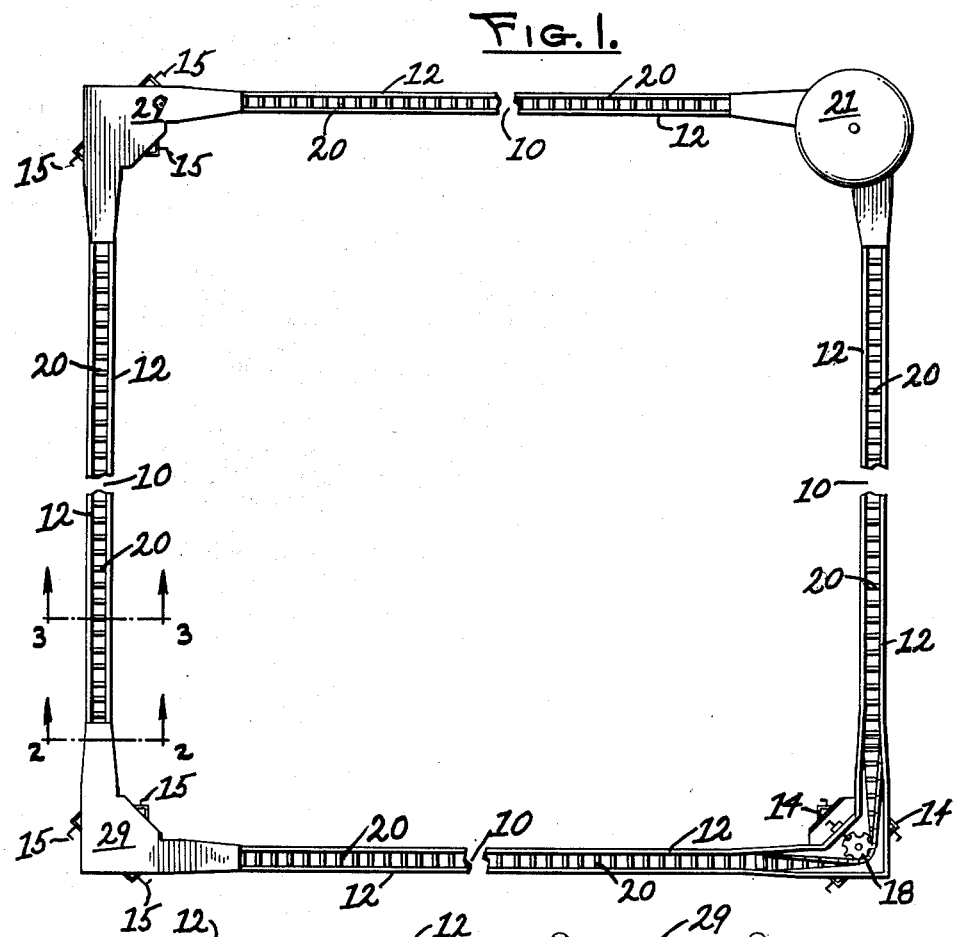
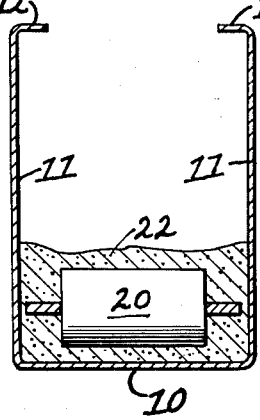
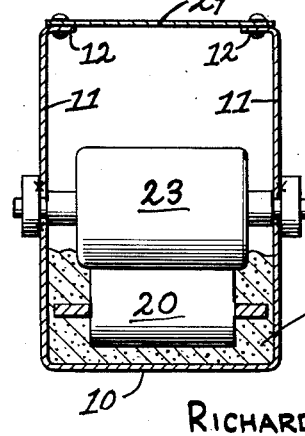
INVENTOR
RICHARD A. DeWITT
By Rice and Rice
ATTORNEYS Nov. 10, 1953 R. A. DE WITT 2,658,605
CONVEYER
Filed June 15, 1949 2 Sheets-Sheet 2
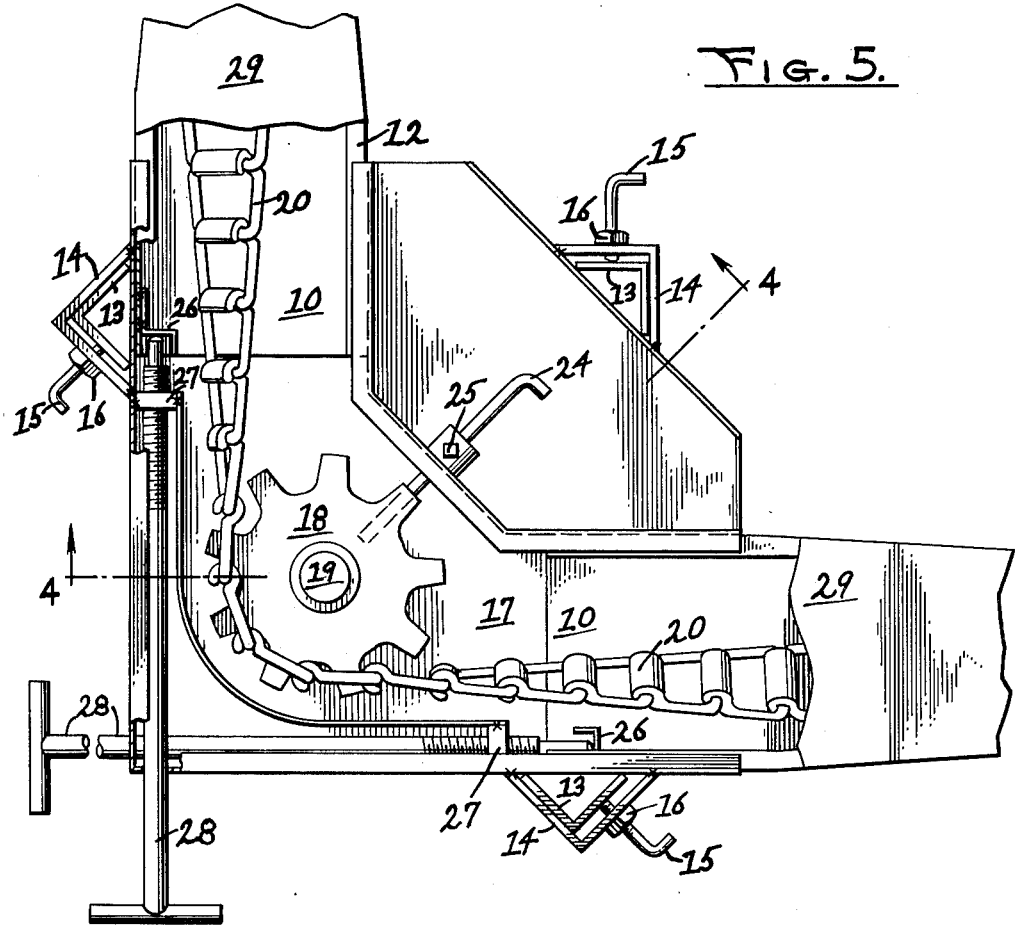
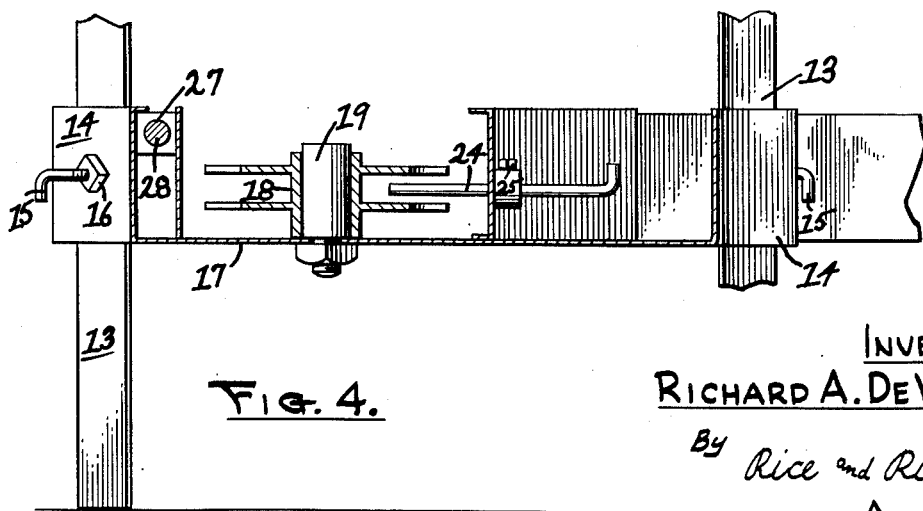
INVENTOR
RICHARD A. DE WITT
By Rice and Rice
ATTORNEYS

Patented Nov. 10, 1953

2,658,605

UNITED STATES PATENT OFFICE 2,658,605

CONVEYER

Richard A. De Witt, Zeeland, Mich., assignor to Automatic Poultry Feeder Company, Zeeland, Mich., a corporation of Michigan Application June 15, 1949, Serial No. 99,169

4 Claims. (Cl. 198—168)

The present invention relates to poultry feeders and more particularly to such feeders which are provided with a feed trough wherein feed from a feed hopper is carried throughout the conveyor's length by means of an endless conveyor.

The primary objects of the instant invention are: to provide a poultry feeder of the general character above indicated whose endless conveyor element for circulating the feed within the feed trough is of a width substantially equal to that of the inside width of the feed trough for improved transportation of the feed therein; to provide such a poultry feeder having novel means for tightening the endless conveyor element both at the time of the original installation and from time to time during its use when it becomes stretched through wear; to provide such a poultry feeder having novel means to make the endless conveyor element travel parallel with the floor of the feed trough during substantially its entire circuit therein to better convey the feed released therein from the feed hopper; to provide such a poultry feeder having a rectangularly formed feed trough at whose several corners novel means are provided to improve movement of the feed therearound; to provide such a poultry feeder which is highly efficient in its intended use; and, to provide such a poultry feeder which is reasonably economical in installation, operation and manufacture.

An illustrative embodiment of the invention is shown in the accompanying drawings, wherein:

Figure 1 is a fragmentary top plan view of the poultry feeder;

Figure 2 is an enlarged sectional view on line 2—2 of Figure 1;

Figure 3 is an enlarged sectional view on line 3—3 of Figure 1;

Figure 4 is a sectional view on line 4—4 of Figure 5; and

Figure 5 is an enlarged, fragmentary, plan view of one of the corners of the rectangularly formed poultry feeder, a portion thereof being broken away to better show the operating mechanism therein.

Referring then to the drawings wherein like parts of the poultry feeder illustrated are designated by the same numerals in the several views, the structure there shown comprises a rectangularly formed feed trough, generally designated 10, whose opposite side walls 11 are each turned inwardly at 12. The feed trough is vertically, adjustably supported adjacent opposite ends of each outer corner and at each inner corner by angle iron legs 13, each slidably disposed within an angle iron bracket 14 secured to the outer wall of the trough. Each of the legs 13 are maintained in vertically adjusted position by a manually operable threaded bolt 15 threadedly engaging the nut 16 affixed to an outer wall of each bracket 14. The inner end of the shank of each bolt 15 bears against a wall of its proximate leg 13, all as best viewed in Figure 5.

The opposite ends of the several lengths of the feed trough 10 each telescope within an opposite end of its proximate corner trough 17. Each of the corner troughs 17 is provided with a radially divided sprocket wheel 18 secured to and rotatable with a vertically disposed rotatable shaft 19. An endless conveyor 20, here shown as a sprocket chain of substantially the same width as the cross sectional, inner width of the feed trough 10, travels over the sprocket wheels 18.

A feed hopper 21, diametrically shown, is disposed above one corner trough 17 and is provided with a feed emitting opening in its floor, not shown, for delivering feed 22 therein to the feed trough 10. An electric motor, not shown, wired to a suitable source of electric energy, is preferably disposed below the hopper 21 and is operably connected with the sprocket wheel shaft 19 therebelow for rotating the sprocket wheel 18. This effects movement of the endless sprocket chain 20 moving the feed within the feed trough delivered thereto from the hopper.

Means for causing the endless conveyor chain 20 to travel parallel with the floor of the feed trough 10 during substantially its entire length and both immediately before and after it travels over the sprocket wheels 18 in each corner trough 17 is here shown as an idler roller 23 disposed adjacent each opposite end of each length of the feed trough. Each idler roller 23 is parallel to and spaced above the floor of the feed trough 10 between the trough's opposite walls 11. The sprocket chain 20 travels below the idler rollers 23.

Means for preventing clogging of the feed 22 between the inner walls of the radially divided sprocket wheel 18 comprises a bolt 24 passing transversely through the inner vertical wall of each corner trough 17. The bolt 24 is adjustably secured therein by a set screw 25. The inner shank end of the bolt 24 projects between the inner walls of the radially divided sprocket wheel, all as best viewed in Figure 4.

The inner surface of the outer wall 11 at each end of each of the feed troughs 10 is provided with an L-shaped bracket 26. The inner surface of the outer wall of each corner trough 17 is provided with a lug 27. A screw threaded aperture in each leg 27 receives one of the threaded, manually rotatable bolts 28. The inner end of each bolt 28 engages one of the brackets 26 whereby the telescoped ends of the feed trough 10 within their corner troughs may be separated for tightening the endless conveyor chain at the time of the original installation and from time to time during its use and after it becomes stretched through wear, all as best viewed in Figure 5.

Cover plates 29 are preferably provided to cover each corner trough 17. Feed 22 discharged from the hopper 21 into the feed trough 10 is thus transported throughout its length by the travel of the endless conveyor 20 whereby poultry may eat from the trough over its entire length except at the corner troughs 17 which are here shown as covered by the cover plates.

It will thus be seen that the poultry feeder herein shown and described has a rectangular feed trough within which is disposed an endless conveyor element of a width substantially equal to that of the inside width of the trough to better transport the feed therein. Novel means are provided for tightening the endless conveyor both at the time of the original installation and from time to time during its use and after it becomes stretched through wear. Novel means are also provided for causing the endless conveyor element to travel parallel to the floor of the feed trough during substantially the entire length of its travel therein.

While but one specific embodiment of the invention has been herein shown and described, it will be understood that certain details of the construction shown may be altered or omitted without departing from the spirit of the invention as the same is defined in the following claims.

I claim:

1. In a conveyor, the combination comprising: a trough having corners therein; said trough, between said corners, being open along its upper face; a vertical shaft at each of said corners; a rotatable sprocket on said shaft; a chain of of generally rectangular cross-section movable along said trough with one of the sides of greater dimension parallel to the floor of said trough; a roller mounted in said trough adjacent each end of each of said corners and above said chain; the axis of said rollers being parallel to the floor of said trough, for causing said chain to lie parallel to the floor of said trough before entering and after leaving each of said corners.

2. In a conveyor, the combination comprising: a trough having corners therein; said trough, between said corners being open along its upper face; a vertical shaft at each of said corners; a rotatable sprocket on said shaft; a chain of generally rectangular cross-section movable along said trough with one of the sides of greater dimension parallel to the floor of said trough; said chain having a width substantially equal to the inside width of said trough; said chain mounted on said sprockets for travel around said corners; a roller mounted in said trough adjacent each end of each of said corners and above said chain; the axis of said rollers being parallel to the floor of said trough, for causing said chain to lie parallel to the floor of said trough before entering and after leaving each of said corners.

3. In a conveyor, the combination comprising: a trough having corners therein; said trough, between said corners, being open along its upper face; a vertical shaft at each of said corners; a rotatable sprocket on said shaft; a chain of generally rectangular cross-section movable along said trough with one of the sides of greater dimension parallel to the floor of said trough; said chain mounted on said sprockets for travel around said corners; said chain at each of said corners being rotated 90° about its longitudinal axis whereby its greater cross-sectional dimension is arranged vertically where said chain is mounted on said sprockets; a roller mounted in said trough adjacent each end of each of said corners and above said chain; the axis of said rollers being parallel to the floor of said trough, for causing said chain to lie parallel to the floor of said trough before entering and after leaving each of said corners.

4. In a conveyor, the combination comprising: a trough having a plurality of straight sections; said trough open along its upper side; a corner unit mounted between certain of said straight sections, the ends of said certain straight sections being telescopically received into said corner unit; a bearing member mounted to the inside surface of each of said certain trough sections adjacent the telescoping end thereof; a pair of threaded rods mounted in each corner unit; each of said rods adapted to bear against one of said bearing members; a vertical shaft mounted in each of said corners; a rotatable sprocket on said shaft; a chain of generally rectangular cross-section movable along said trough with one of the sides of greater dimension parallel to the floor of said trough; said chain mounted on said sprockets for travel around said corners; a roller mounted in said trough adjacent each end of each of said corners and above said chain; the axis of said rollers being parallel to the floor of said trough, for causing said chain to lie parallel to the floor of said trough before entering and after leaving each of said corners.

RICHARD A. DE WITT.

References Cited in the file of this patent

UNITED STATES PATENTS

| Number | Name | Date |
|---|---|---|
| 875,389 | Theede | Dec. 31, 1907 |
| 1,707,998 | Shaw | Apr. 9, 1929 |
| 2,155,874 | Sinden | Apr. 25, 1940 |
| 2,222,019 | Buchanan | Oct. 19, 1940 |
| 2,282,534 | Sinden | May 12, 1942 |
| 2,302,314 | Haggart | Nov. 17, 1942 |
| 2,386,619 | Long | Oct. 9, 1945 |

FOREIGN PATENTS

| Number | Country | Date |
|---|---|---|
| 520,825 | Germany | Mar. 14, 1931 |

OTHER REFERENCES

"Automatic Poultry Feeder Plan," Progress Report No. 2, Sept. 1948, Penn State Coll. School of Agri., State College, Pa.

Redler Conveyor-Elevators, Catalog No. 140, Stephens-Adamson Mfg. Co., Los Angeles, California, page 23, Copyright 1940.